United States Patent
Matsuo et al.

(10) Patent No.: US 7,072,782 B2
(45) Date of Patent: Jul. 4, 2006

(54) THERMOELECTRIC MEASURING METHOD AND THERMOELECTRIC MEASURING APPARATUS USING THEREOF

(75) Inventors: Shuichi Matsuo, Ome (JP); Taisei Hirayama, Akishima (JP)

(73) Assignee: Rigaku Corporation, Tokyo (JP)

( * ) Notice: Subject to any disclaimer, the term of this patent is extended or adjusted under 35 U.S.C. 154(b) by 202 days.

(21) Appl. No.: 10/855,592

(22) Filed: May 28, 2004

(65) Prior Publication Data

US 2004/0243327 A1 Dec. 2, 2004

(30) Foreign Application Priority Data

May 29, 2003 (JP) ............................ 2003-152567
Jan. 27, 2004 (JP) ............................ 2004-018381

(51) Int. Cl.
G01R 27/00 (2006.01)
G01K 7/00 (2006.01)
G01K 1/16 (2006.01)

(52) U.S. Cl. ........................................ 702/65; 702/130
(58) Field of Classification Search ................. 702/24, 702/57, 65, 130; 73/24.06, 31.06, 31.07; 374/16, 24; 422/83, 98
See application file for complete search history.

(56) References Cited

U.S. PATENT DOCUMENTS 5,090,817 A * 2/1992 Ker et al. ...................... 374/24
6,703,241 B1 * 3/2004 Sunshine et al. ............. 436/8
2002/0024349 A1 2/2002 Hirayama et al.

FOREIGN PATENT DOCUMENTS

JP 08-062885 3/1996
JP 2002-071599 3/2002

OTHER PUBLICATIONS

Hori, K. et al, "*Thermally Stimulated Current Spectra of Powdered Binder-Resins for Toner*," a paper of Japan Electrostatic Institute '94 (Aug. 1994), pp. 247-250; Japan.

(Continued)

*Primary Examiner*—Bryan Bui
(74) *Attorney, Agent, or Firm*—Antonelli, Terry, Stout and Kraus, LLP.

(57) ABSTRACT

In a method for measuring thermo electricity and an apparatus thereof, enabling to measure the physical characteristics including electrification of a sample even in a humid (water-vapor) atmosphere, a sample 10 of powder to be measured and formed in a predetermined shape is disposed within an inside of an electric furnace 30, building up a heating and temperature increasing portion, which is stored within a constant-temperature container of three(3)-layers (51, 52, 53) structure (or may be two(2)-layers structure), forming a measuring chamber 50 in an inside thereof. While increasing the temperature, a measuring apparatus for detecting the thermal stimulated current (TSC) by means of a minute current detector connected to electrodes, which are provided opposing to the sample 10, and there is further provided a water-vapor generating apparatus 100 for guiding a water-vapor atmosphere at a predetermined value into the measuring chamber 50 of the constant-temperature container. Further, the temperature of the constant-temperature water supplied from a constant-temperature water supply apparatus into the constant-temperature container is set to be a little bit higher than that of the water-vapor atmosphere supplied from the water-vapor generating apparatus 100.

16 Claims, 6 Drawing Sheets

OTHER PUBLICATIONS

Takahashi, Os., et al, "*Emission of Charged Particles by Friction and its Effect on Frictional Charging*," a magazine of Japan Electrostatic Institute, 20.4 (1996), pp. 252-254; Japan.

Ikezaki, K., et al, "*Fundamental Electric Properties of Powder-Formed Material*", a magazine of Japan Electrostatic Institute, 22.2 (1998), pp. 79-82; Japan.

Kuwabara, R., et al, "*Thermal Shrinkage Effect of Powder-Formed Polymers on their Thermally Stimulating Current Spectra*," a paper of Japan Electrostatic Institute, '00 (Sep. 2000), pp. 229-232; Japan.

Hashimoto, T. ,et al, "*Thermally Stimulated Current Spectra of Cryogenically Pulverized Polypropylene*", a paper of Japan Electrostatic Institute, '01 (Sep. 2001), pp. 111-114; Japan.

Suganami, K., "*Configuration of CCA Particles in the Toner Surface and Its Influence on Charging Characteristics*", a magazine of Society of Powder Technology, Japan, 39 (2002), pp. 642-647; Japan.

Hori, T., et al, "*Thermally Stimulated Currents of Pulverized Polymers*," Journal of Electrostatics 40 & 41 (1997), pp. 313-318; Japan.

Ogiwara, T., et al, "*Evaluation of Charge Retention Properties of Powder Paints by Thermally Simulated Currents Spectroscopy*," Inst. Phys. Conf. Ser. No. 163, Paper presented at the 10th International Conference, Cambridge, pp. 325-328, Mar. 1999.

Yamada, Y., et al, "*Effect of Pulverization on Charge Trapping Properties of Polymethylmethacrylate*" Journal of Electrostatics, 44 (1998), pp. 53-60; Japan.

Qinquan et al Effect of Temperture and Humidity On Electrical Breakdown Characteristics of Low-Density Polyethylene Film For The Various Stressing Modes, Sep. 12, 1998 (pp. 590-593 (XP010076270.

Wuinquan Effect of Humidity In The Thermally Stimulated Current Spectra In Low-Density Polyethylene, 1985, New York, USA pp. 421-424 XP008050124.

Reber et al, Thermally Stimulated Current Measurements of SI02 Defect Density And Energy In Irradiated Metal-Oxide-Semiconductor Capacitors, Review of Scientific Instruments, American Institute Of Physics, New York USA, vol. 63, No. 12, Dec 1, 1992, pp. 5714-5725, XP000330438.

* cited by examiner

THERMOELECTRIC MEASURING METHOD AND THERMOELECTRIC MEASURING APPARATUS USING THEREOF

BACKGROUND OF THE INVENTION

The present invention relates to a thermoelectric measuring method for analyzing physical properties or characteristics of a sample through measurement of the thermoelectricity flowing therethrugh, in particular, the thermoelectric measuring method for enabling the measurement of the physical properties of a powder, such as, toner for use in electrophotography, for example, with using such the thermoelectric measuring method under the desired atmosphere of water vapor, and it also relates to a thermoelectric measuring apparatus for making an analysis through measurement of the thermal stimulated current thereof, as well as, a thermoelectric measuring apparatus using thereof.

A method for analyzing the physical properties or characteristics of a material to be measured (i.e., a sample), through measurement of the thermal stimulated current (TSC) thereof, is already known, for example, in JIS (Japanese Industrial Standard), K7131, etc., as to be the thermoelectric measuring method for analyzing the physical characteristics of the sample through measuring the thermoelectricity. In such the already well-known analyzing method, such as, a testing method of thermal stimulated current of a plastic film, detection is made upon current of a femto-ampere order ($fA=10^{-15}A$) or a pico-ampere order (pA) (this is, so-called the thermal stimulated current (TSC)), which flows in an external circuit putting a test piece or tip there between, when dielectric polarization and/or electric charges are released or discharge due to an increase of temperature thereof, which are frozen or trapped within the test tip of a dielectric substance or an insulating material, such as, plastics, for example, under low temperature (for example, $-180°$ C.), thereby analyzing the physical characteristics of the materials.

In a measuring apparatus of using such the TSC method, as is known from the following Patent Document 1, a sample assembly includes wires, being pull out from an electrode contacting upon the surface of a sample and supported by a pair of supporting rods, and that assembly is so structured that it can be received within an inside of an electric furnace for use of an increase of temperature, around the outer periphery of which is wound with a heater coil. And, that assembly and the electric furnace are received within a container for building up the thermal insulation thereof and the electromagnetic shielding from an outside thereof. Further, this sample container has such the structure, that a space is provided for circulating liquid nitrogen, etc., or constant-temperature water therein, for example, within an inside of a vacuum chamber provided for heat-insulation from the outside, for bringing the inside thereof to be controllable at a desired temperature, and further to receive the assembly and the electric furnace within an inside thereof.

Also, a measuring method for measuring the charging with electricity or electrification characteristics is already known from the following Patent Document 2, of the toner for use of the electrophotography, being as the powder material, in particular, with using a method for analyzing the physical characteristics with an aid of the TSC method.

Thus, in this Patent Document 2 it is described that, after being weighted, a certain amount of the toner to be measured for use of electrophotography is mounted on an electrically conductive support (i.e., an electrode), and is suppressed by a plunger under the room temperature, thereby being formed into a disc-like shape through the pressure forming. Then, it is charged with electricity thereon by means of a corona electrifier, to be a toner sample. And then, this charged or electrified toner sample is introduced into the measuring apparatus, and current is detected from the opposing electrodes while increasing the temperature at a predetermined increasing rate or velocity with an aid of a thermo-couple, thereby enabling the composition and the physical characteristics of resin for the toner obtainable, as well as, a preparation of the toner, and further quantitative data being useful for studying the relationship between and the condition and the electrification characteristic thereof.

Patent Document 1: Japanese Patent Laying-Open No. 2002-071599 (2002); in particular FIG. 4 thereof; and Patent Document 2: Japanese Patent Laying-Open No. Hei 8-62885 (1996); in particular FIGS. 5 and 6 thereof.

Also, relating to the Patent Document 2 mentioned above, the following Non-Patent Documents are already known:

Non-Patent Document 1: Kenji HORI, et al. "Thermally stimulated current spectra of powdered binder-resins for toner", a paper of Japan Electrostatic Institute '94 (1994.8) pp. 247–250;

Non-Patent Document 2: Osamu TAKAHASHI, et al. "Emission of Charged Particles by Friction and Its Effect on Frictional Charging", a magazine of Japan Electrostatic Institute, 20, 4 (1996) pp. 252–254;

Non-Patent Document 3: Kazuo IKEZAKI, et al. "Fundamental Electric Properties of Powder-Formed Material", a magazine of Japan Electrostatic Institute, 22, 2 (1998) pp. 79–82;

Non-Patent Document 4: Ronji KUWABARA, et al. "Thermal shrinkage effect of power-formed polymers on their thermally stimulating current spectra", a paper of Japan Electrostatic Institute, '00 (2000.9) pp. 229–232;

Non-Patent Document 5: Tatunori HASHMOTO, et al. "Thermally Stimulated Current Spectra of Cryogenically Pulverized Polypropylene", a paper of Japan Electrostatic Institute, '01 (2001.9) pp. 111–114; and Non-Patent Document 6: Keiki SUGANAMI, et al. "Configuration of CCA Particles in the Toner Surface and Its Influence on Charging Characteristics", a magazine of Society of Powder Technology, Japan, 39, pp. 642–647 (2002).

By the way, with such the measurement and the apparatus of using the TSC method therein, relating to the conventional arts mentioned above, in general, a sample to be measured is charged with electricity by means of a corona electrifier, for example, and it is measured within a helium gas or an air (i.e., the atmosphere). In case of a helium gas, it contains no water vapor therein, and in case of an air, it depends upon the condition (i.e., the humidity) of the atmosphere at that time. Namely, with the conventional art, it is impossible to make measurement upon the sample to be measured under an atmosphere adjusted in the humidity thereof.

However, in particular, for a powder sample, such as, the toner for use in the electrophotography or the like, for example, known from the Patent Document 2 mentioned above, sometimes it is necessary to make the measurement thereon, within an atmosphere of a desired humidity (e.g., water vapor). For example, the performances of the toner for use in the electrophotography are determined upon an amount of electric charge or electrification thereon, however this amount of electric charge is further influenced upon the temperature and the humidity, largely. Also, for the purpose of measuring the toner for use in the electrophotography under the condition near to the actual use situation thereof, there is required a method for measuring the thermoelectricity, enabling the measurement thereof even within the atmosphere of humidity (or water vapor), and further an apparatus for measuring the thermoelectricity for it.

SUMMARY OF THE INVENTION

Then, according to the present invention, it is an object to dissolve such the problems in the conventional arts mentioned above, and in more details thereof, to provide a method for measuring the thermoelectricity, thereby enabling an analysis upon the physical properties or characteristics of a sample through measuring or detecting the thermoelectricity even under an atmosphere of desired humidity (or water vapor), and in addition thereto, with using such the method for measuring the thermoelectricity thereof, to provide a method for measuring the thermal electricity, thereby enabling measurement on the physical properties or characteristics, in particular, including the electrification characteristic of the powder sample, such as, the toner for use in the electrophotography, for example, as well as, an apparatus for measuring the thermoelectricity for it.

For accomplishing such the object, according to the present invention, firstly there is provided a method of measuring thermoelectricity for analyzing physical characteristics of a sample through measuring thermoelectricity thereof, comprising the following steps of: a step for mounting the sample within an inside of a sample measuring apparatus, so as to measure the thermoelectricity thereof, wherein said measurement of the thermoelectricity is conducted upon said sample within an inside of said measuring apparatus, while keeping a measuring chamber thereof to be in an atmosphere of a desired water vapor within said measuring apparatus, in said measuring step of said thermoelectricity. Further, according to the present invention, in the method of measuring thermoelectricity mentioned above, it is preferable that a gas containing therein the water vapor at said desired value thereof is supplied into said measuring chamber within the inside of said measuring apparatus from an outside thereof, while setting a wall temperature of said measuring chamber to be a little bit higher than temperature of said gas, for keeping the atmosphere of water vapor within the measuring chamber of said measuring apparatus to be within a desired value thereof.

Also, according to the present invention, there is provided a method of measuring thermoelectricity for analyzing physical characteristics of a powder through measuring thermoelectricity thereof, with using the thermoelectricity measuring method as is described in the above, comprising the following steps: a step for forming said power into a predetermined shape; a step for charging said powder formed into the predetermined shape with electricity; and a step for loading said shaped powder, being charged with electricity, into the inside of said measuring apparatus and for measuring thermal stimulated current thereof, wherein: the thermal stimulated current is measured upon the shaped powder, being charged with electricity, while keeping the inside of the measuring chamber of said measuring apparatus to be the desired atmosphere of water vapor, in said measuring step of said thermal stimulated current.

Further, according to the present invention, there is also provided an apparatus of measuring thermoelectricity, for the method of measuring thermoelectricity as described in the above, comprises: a constant-temperature chamber portion, within which said measuring chamber is formed; a heating-up portion, being received within said constant-temperature chamber portion; an electrode portion, being received within an inside of said constant-temperature chamber portion, and having a support electrode for mounting a material to be measured thereon and an opposing electrode, being provided separating from said supporting electrode through said material to be measured; a current detection portion for detecting thermal stimulated current from said material to be measured; and a means for guiding an atmosphere containing water vapor at a desired value thereof into said measuring chamber provided within said constant-temperature chamber portion. Also, according to the present invention, in the apparatus of measuring thermoelectricity, as described in the above, it is preferable that said water vapor atmosphere guiding means is controllable upon humidity of the water vapor guided into said measuring chamber, and also temperature thereof, and that a constant-temperature water supply apparatus, for supply a constant-temperature water to said constant-temperature chamber portion, controls temperature of the constant-temperature water to be supplied, to be little bit higher than the temperature of the water vapor atmosphere to be guided into said measuring chamber.

BRIEF DESCRIPTION OF THE VARIOUS VIEWS OF THE DRAWING

Those and other objects, features and advantages of the present invention will become more readily apparent from the following detailed description when taken in conjunction with the accompanying drawings wherein.

Figure 4:
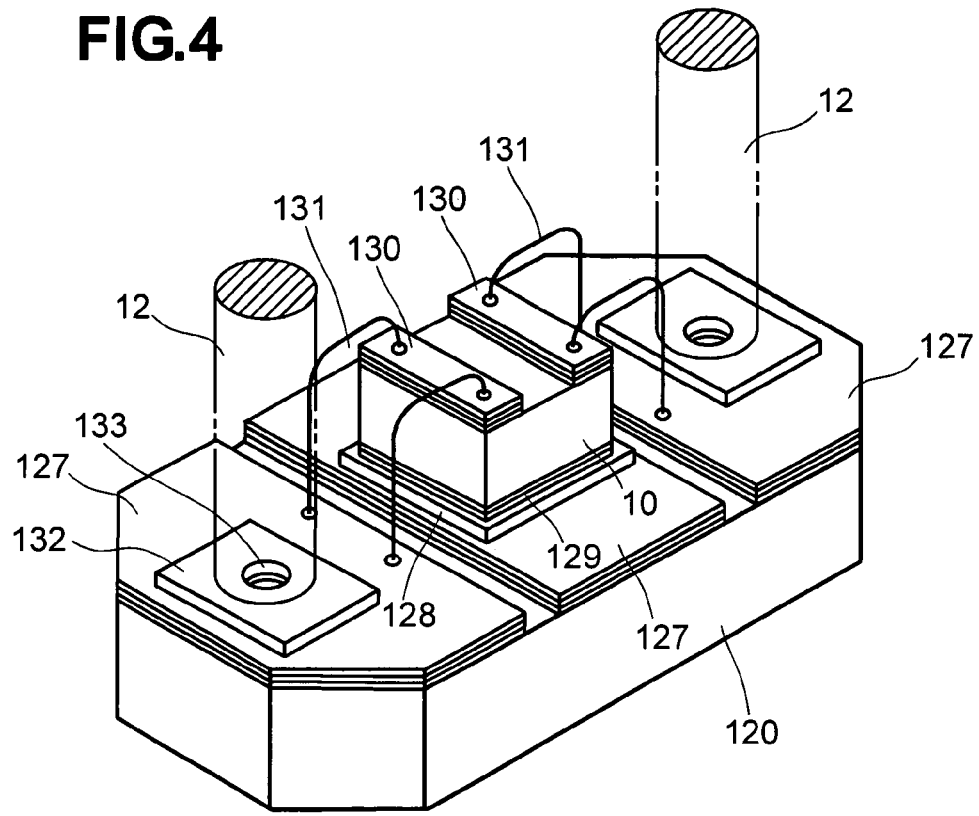
Figure 5:
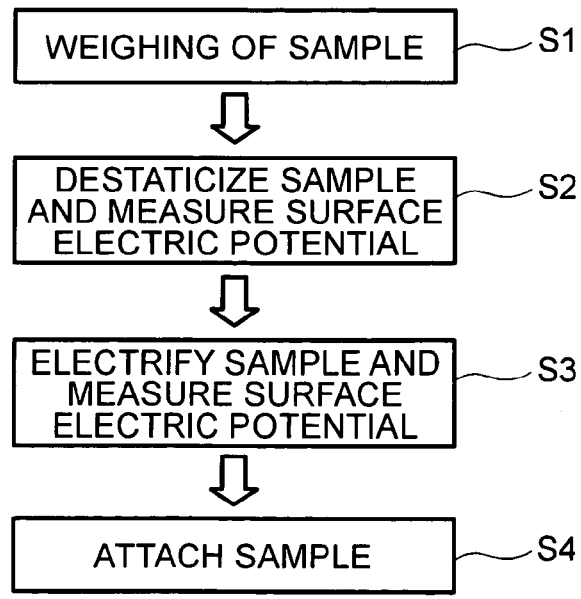

FIGS. 3(*a*) to 3(*c*) are views for showing an example of the structure of the electrodes, in more details thereof, provided in the measuring apparatus mentioned above;

FIG. 4 is a view for showing other example of the structure of electrodes, in the measuring apparatus mentioned above;

FIG. 5 is a flowchart diagram for explaining about a method of measuring the thermoelectricity, measuring an amount of electric charge of the toner for use in electrophotography, with the measuring apparatus mentioned above;

FIGS. 6(*a*) and 6(*b*) are view for showing an example of an actual measurement on the thermal stimulated current (TSC), upon the toner for use in the electrophotography, in more details thereof, with using the measuring apparatus mentioned above; and FIG. 7 is a view for showing an actual measuring result of the thermal stimulated current (TSC), which is actually obtained with using the measuring apparatus mentioned above, but under the different conditions differing in the humidity thereof.

DETAILED DESCRIPTION OF THE INVENTION

Hereinafter, embodiments according to the present invention will be fully explained, by referring to the attached drawings.

Figure 2:
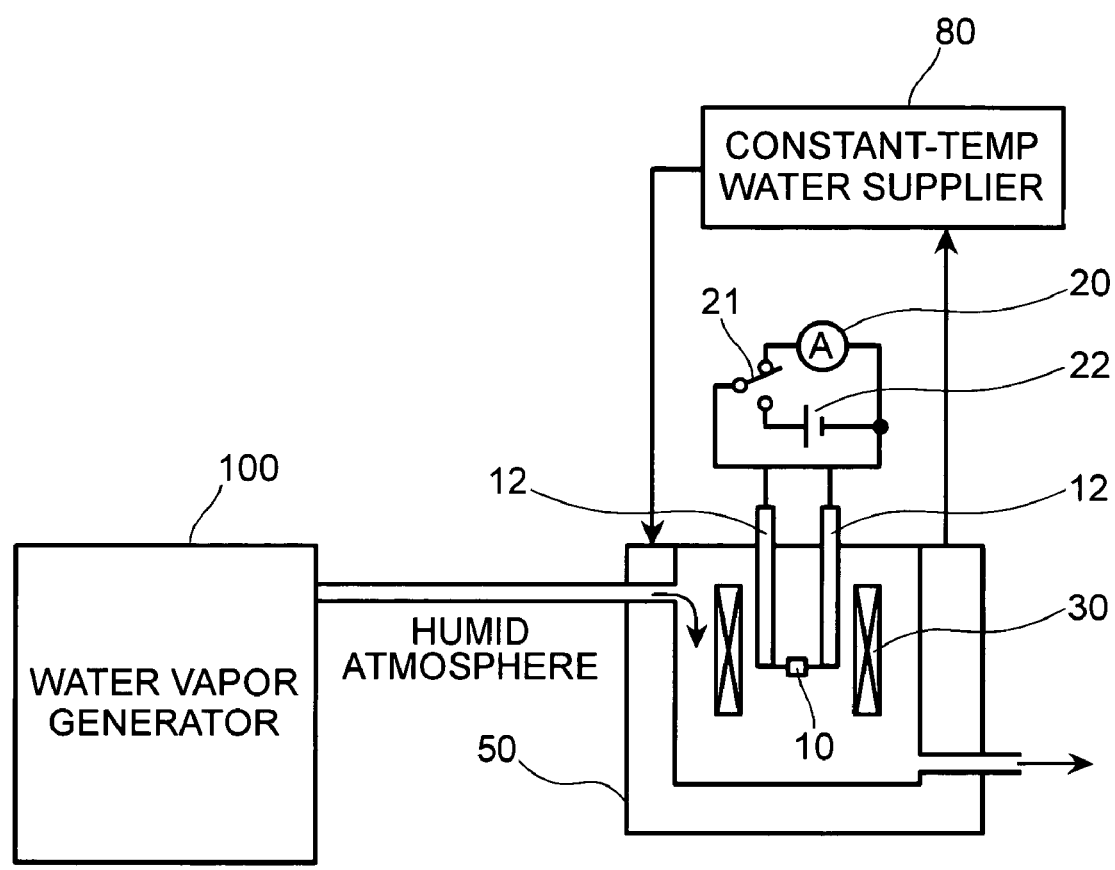
FIG. 2 is a block diagram for showing the outlook structure of the measuring apparatus, including an electric circuit thereof.

First of all, FIG. 2 attached herewith shows a measuring apparatus with applying, such as, the thermally stimulated current (TSC) therein, for example, as one of the measurements of the thermoelectricity, according to an embodiment of the present intervention. In this figure, though will be mentioned later in more details thereof, a sample 10 of a powder, such as, the toner for use of the electrophotography, being formed in a predetermined shape, is attached with a pair of opposing electrode layers forming a container thereof (i.e., an electrode portion, including a supporting electrode, for mounting thereon an article to be measured, and an electrode being provided opposing thereto but separating from the supporting electrode through the article to be measured), and then current is detected in an order of pico-ampere (pA) or femto-ampere (fA=$10^{-15}$A), flowing through an external circuit formed with a test piece (i.e., the sample 10), thereby analyzing the physical characteristics or properties of the material. However, in this figure, a reference numeral 21 depicts a switch, with the function of which a DC current 22 can be selectively connected to the sample, which necessitates an application of DC voltage thereacross.

Figure 3A:
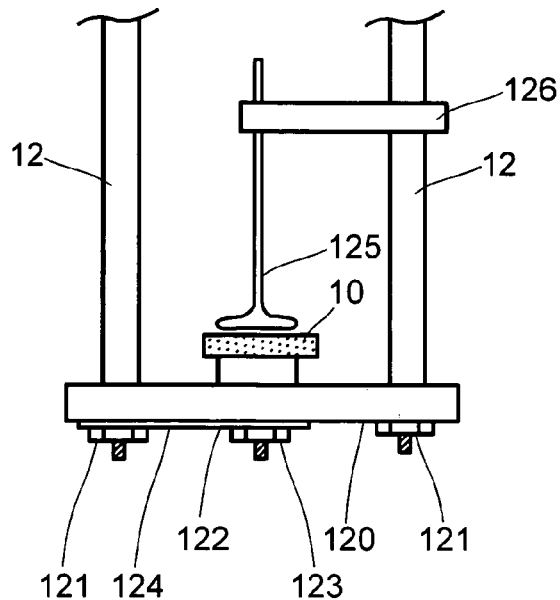
Figure 3B:
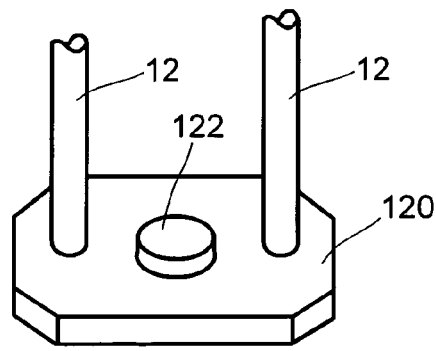
Figure 3C:
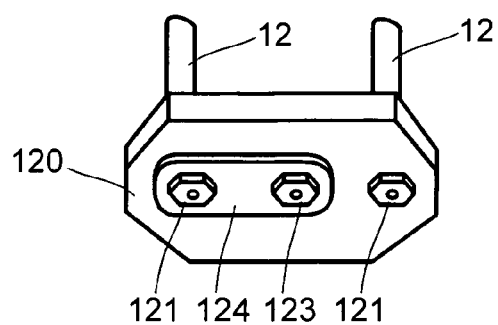

FIGS. 3(a) to 3(c) attached herewith show an example of the detailed structures of the electrode portion mentioned above. Namely, as is shown in FIG. 3(a), a plate-like supporting member 120 made of an insulating material is attached at both the lower ends of a pair of supporting rods 12 and 12 opposing to each other, which are made of a conductive material, by means of, such as, nuts 121 and 121, or the like, for example. Further, at about the central portion of the supporting member 120 (see, FIG. 3(b)), a supporting electrode 122 is also fixed, by means of a nut 123, on which the sample 10 (i.e., a sample assembly) received within the container is mounted. And. as is apparent from FIG. 3(c), in particular, one of the pair of supporting rods (in the figure, the left-hand side one) and the electrode 122 mentioned above are electrically connected to each other through a short bar 124, which is attached on a lower surface of the supporting member 120. On the other hand, onto the other (in the figure, the right-hand side one) of the pair of supporting rods is attached the opposing (non-contact) electrode 125 at a tip portion thereof, and also a supporting element 126 enabling to move vertically along the said supporting rods, thereby adjusting. Further, the condition where the sample 10 is mounted on this electrode portion is shown in FIG. 3(a). In this manner, the sample 10 (i.e., the sample assembly) is electrically connected to a minute current detector 20 (for detecting current of pA or fA order) of the apparatus, through the pair of those supporting rods 12 and 12.

Although the explanation was given only about an example of the opposing (non-contact) electrodes in FIGS. 3(a) to 3(c) mentioned above, however the present invention should not be restricted only to this, and as is shown in FIG. 4 attached herewith, it is also possible to apply the electrodes of the contact type. However, in this example, an intermediate electrode layer 127 is formed on the plate-like supporting member 120 made of the insulating material, and at the central portion of the intermediate electrode layer 127 is an adhesive layer 128, and further on the upper surface thereof is a films of two(2)-layers structure of Ti and Au is formed, for example. Also, a reference numeral 130 in the figure depicts a pair of electrode layers formed on the upper surface of the sample 10 mentioned above, and a reference numeral 131 is a wire made of Au, for example, for electrically connecting between the pair of electrode layers 130 and the intermediate electrode layers 127 formed at both ends of the supporting member 120. In addition thereto, a reference numeral 132 depicts a washer of Au, and a reference numeral 133 a female screw, to be engaged with a screw which is formed in the lower-end portion of each of the supporting rods 12.

Again, turning back to FIG. 2 mentioned above, in the periphery of this sample 10, there is disposed an electric furnace 30, which is built up with a heater coil being wound around a cover being about cylinder-like in the shape thereof. This electric furnace 30 is able to elevate, and therefore it can covers the periphery of the sample 30 (i.e., the sample assembly) being disposed within the apparatus when it lowers down the position thereof. Or alternately, it is also possible to dispose the sample 10 (i.e., the sample assembly) within an inside of the electric furnace 30 by bringing the sample 10 (i.e., the sample assembly) to be able to elevate, otherwise than that. Further, the heater coil making up the electric furnace 30 is supplied with heating current through a current controller not shown in the figure, thereby rises up the temperature of the sample 10 at a desired rate or velocity of an increase of temperature.

Figure 1:
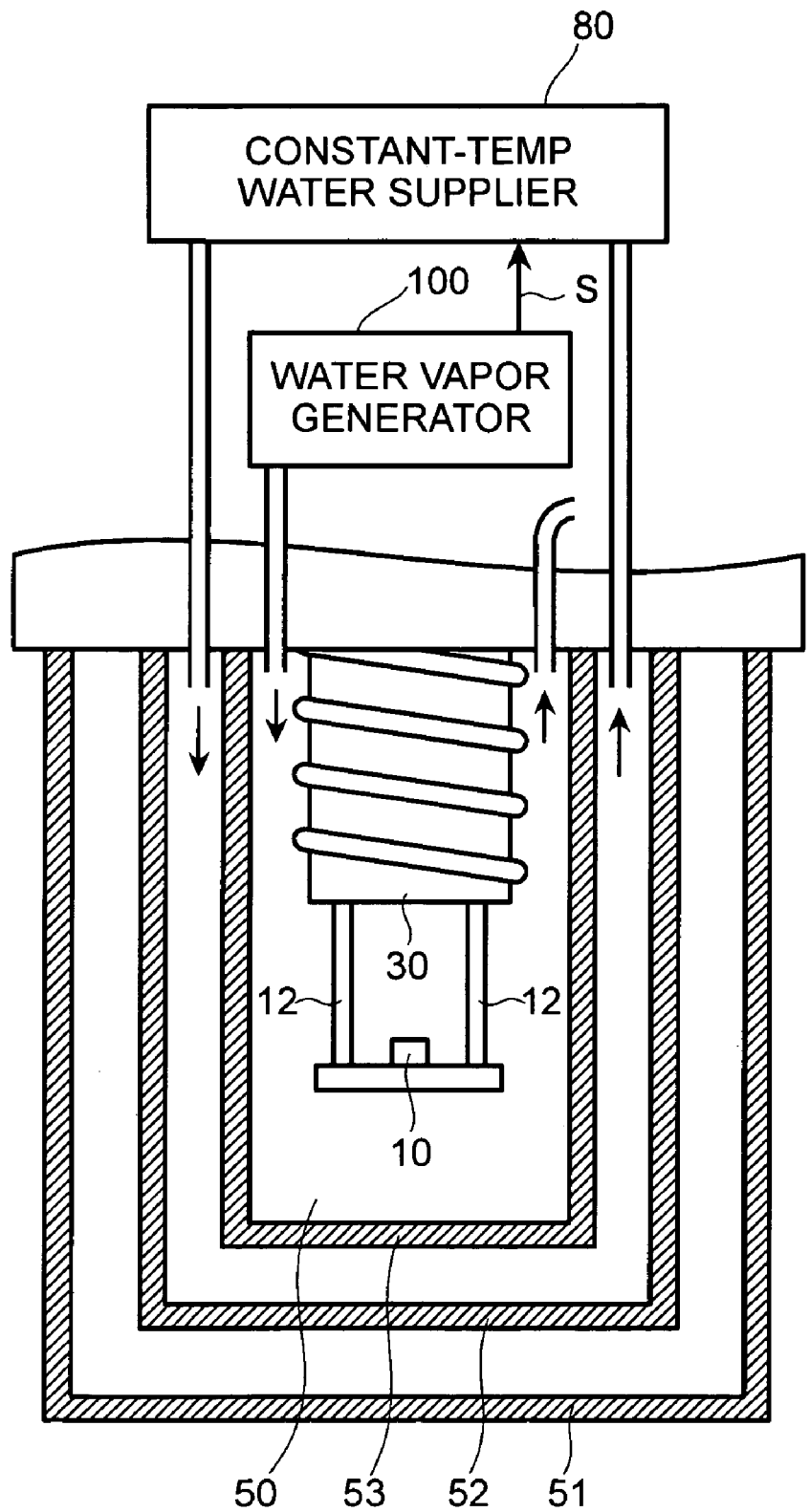
FIG. 1 is a cross-section view for showing the outlook structure of a measuring apparatus, with using the thermal stimulated current (TSC) therein, according to one embodiment of the present invention.

Further, in FIG. 1 attached herewith, there is also shown the outlook structure of the sample assembly, including the sample 10 therein, the supporting rods 12 and 12, and the electric furnace 30, etc. And, those sample assembly and the others are stored or received within a measuring chamber 50, being a container, the details of which will be mentioned later.

Namely, with the measuring chamber 50 for receiving the sample assembly within an inside thereof, in which the minute current is detected flowing through the sample 10 while increasing the temperature of the sample 10 at the desired velocity of increase of temperature, it is made of stainless, for example, and is formed in a cylindrical shape having a bottom, for building up an electromagnetic shield as well as a constant-temperature oven therewith, as is shown in the figure. In the example shown in this figure, it has the three(3)-layer structure, including an outer case 51, a middle case 52 and a inner case 53, for example. Thus, the space defined between the outer case 51 and the middle case 52 is vacuumed, thereby thermally cutting off an inside (i.e., the measurement chamber 50) of the container (i.e., the constant-temperature oven) from an outside thereof. Further, between the middle case 52 and the inner case 53 is also formed a so-called, the constant temperature layer. In more details thereof, a constant-temperature water supply apparatus 80, including a pump, etc., for example, though not shown in the figure, is connected to the constant temperature layer, which is defined between the middle case 52 and the inner case 53, to be supplied with a constant temperature water of desired temperature, including, such as, a room temperature, etc., from an outside thereof, for the purpose of maintaining an inner wall of the container (i.e., the constant temperature container), so as to prevent a dewdrop from condensing on an inside of the case 53. Also, thought not shown in the figure, this constant-temperature water supply apparatus 80 comprises a temperature controller therein, thereby bringing the temperature of the constant-temperature water to be supplied being settable, appropriately, and selectively. However, the measuring chamber 50 was explained to have the vacuum outer case 51 at the outermost periphery thereof in the above, by taking the case when lowering the temperature of the sample down to a low temperature (such as, −180° C., for example) into the consideration, however when this is not necessary, it is needless to say that the apparatus may has the structure (e.g., the two(2)-layers structure) removing the outer case 51 therefrom. And, it is also possible to provide a hydroscope within the measuring chamber for detecting the humidity within an inside thereof, thereby building up the structure of so-called the beef-back control.

And, according to the present invention, there is further provided a water-vapor generator 100, and with this, a water-vapor atmosphere at desired temperature and at desired humidity can be supplied into the inside (e.g., the measuring chamber 50) of the container mentioned above (e.g., the constant-temperature container equipped with the electromagnetic shield thereon). As an example of this water-vapor generator 100, according to the present invention, a "Humidity Controller" HUM-1, manufactured by Rigaku Co., Japan, is used, thereby obtaining the water-vapor atmosphere at the desired temperature and at the desired humidity thereof, appropriately and selectively, for example, within the range of the temperature from the room temperature up to 60° C. and within the range of humidity concentration from 20% RH up to 90% RH, for example, to be guided into the inside of the container (e.g., the measuring chamber 50) through a conduit 110, for example. Also, this water-vapor generator 100 is able to convert the information relating to the humidity and/or the temperature of the water-vapor generated therein into an electric signal S (including a digital/analog signal), so as to be transmitted to the constant-temperature water supply apparatus 80.

Following to the above, explanation will be give in more details thereof, hereinafter, upon a measuring method of the thermoelectricity for analyzing the physical characteristics or properties of the powder with using the measuring apparatus, the structure of which was explained in the above, and in particular, about the measuring method of the thermoelectricity, for measuring an amount of electric charge or electrification upon the toner for use of the electrophotography, under the condition near to that of the actual use thereof.

As is shown in FIG. 5 attached herewith, first the sample (i.e., the toner for use of the electrophotography) is put into a container and weighted (in a step S1). Following thereto, the sample is put into a destaticizer or static eliminator, thereby bringing the amount of electric charge down to zero (0), and thereafter the surface potential thereof is measured to check the antistatic or destaticized condition thereof (in a step S2). Further, the sample is put into an electrifier (for example, a corona electrifier, etc.), thereby to be charged with a predetermined amount of electric charge thereon, and thereafter the surface potential thereof is measured, so as to check the electrification or charge condition of electricity thereupon, again (in a step S3). Then, the sample obtained in the above manner is attached onto the measuring apparatus mentioned above (in a step S4). Further, in this instance, it is needless to say that the sample is held between the supporting electrode mentioned above and the electrode portion having the opposing electrode, and thereby it is electrically connected to the minute current detector 20 for detecting the minute current of the thermal stimulated current (TSC) flowing therein, such as, of the order of (pA) or (fA).

Figure 6A:
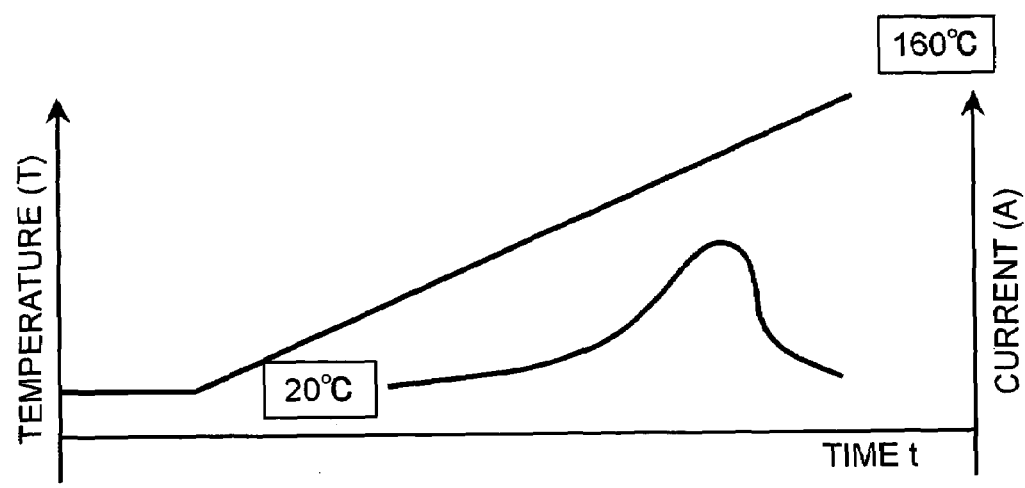
Figure 6B:

Thereafter, for example, as shown in FIGS. 6(a) and 6(b) as attached herewith, the sample is attached within the measuring chamber 50 of the measuring apparatus, the atmosphere within which is adjusted at the constant humidity, and after being left there for a predetermined time period (for example, about 25 minutes), it is started to measure the thermal stimulated current (TSC) while changing the temperature from 20° C. up to 160° C., for example, at the desired rate or velocity of increase of temperature. However, in the embodiment mentioned above, the measurement is started after passing 25 minutes after the charging of electricity (e.g., the electrification), however during 23 minutes within that time period (i.e., 25 minutes), the measurement is conducted while being in the following humidity atmospheres; such as, (A) at the temperature 10° C. and at the humidity 15%, (B) at the temperature 20° C. and at the humidity 65%, and (C) at the temperature 30° C. and at the humidity 90%, for example.

Also, in this instance, as was mentioned in the above, according to the embodiment of the present invention, when supplying the humid atmosphere generated with an aid of the water-vapor generator 100 mentioned above into the measuring chamber 50, thereby setting the humidity within an inside thereof, as was mentioned in the above, the information relating to the humidity and/or the temperature of the water-vapor generated therein is transferred to the constant-temperature water supply apparatus 80, in the structure thereof. Namely, with such the structure, it is possible to control the constant-temperature water to be supplied from the constant-temperature water supply apparatus 80 into the constant-temperature layer, which is defined between the middle case 52 and the inner case 53 building up the measuring chamber 50, appropriately, thereby enabling to escape from giving an ill influence upon the measuring result, such as, due to the dewdrop which is generated through condensation of the water-vapor atmosphere within the inside thereof, irrespective of supplying the water-vapor atmosphere into the measuring chamber 50. Thus, it is possible to measure the thermal stimulated current (TSC) with stability even under the humid atmosphere.

For example, though fluctuating a little bit depending upon the water-vapor concentration (% RH) of the water-vapor atmosphere supplied from the water-vapor generator 100, however the constant-temperature water being supplied from the constant-temperature water supply apparatus 80 to the constant-temperature layer, which is defined between the middle case 52 and the inner case 53 of building up the measuring chamber 50, it is controlled so as to be higher than the temperature of the water-vapor atmosphere to be supplied, a little bit (for example, about from 0° C. up to 5° C.); therefore, it is possible to prevent the water-vapor atmosphere from being condensed into the dewdrop, irrespective of the supply of the water-vapor atmosphere into the measuring chamber 50. However, in that instance, as was mentioned previously, it is also possible to control the temperature of the constant-temperature water, automatically, by utilizing the information relating to the humidity and/or the temperature of the water-vapor, i.e., the electric signal S supplied from the water-vapor generator 100.

Figure 7:
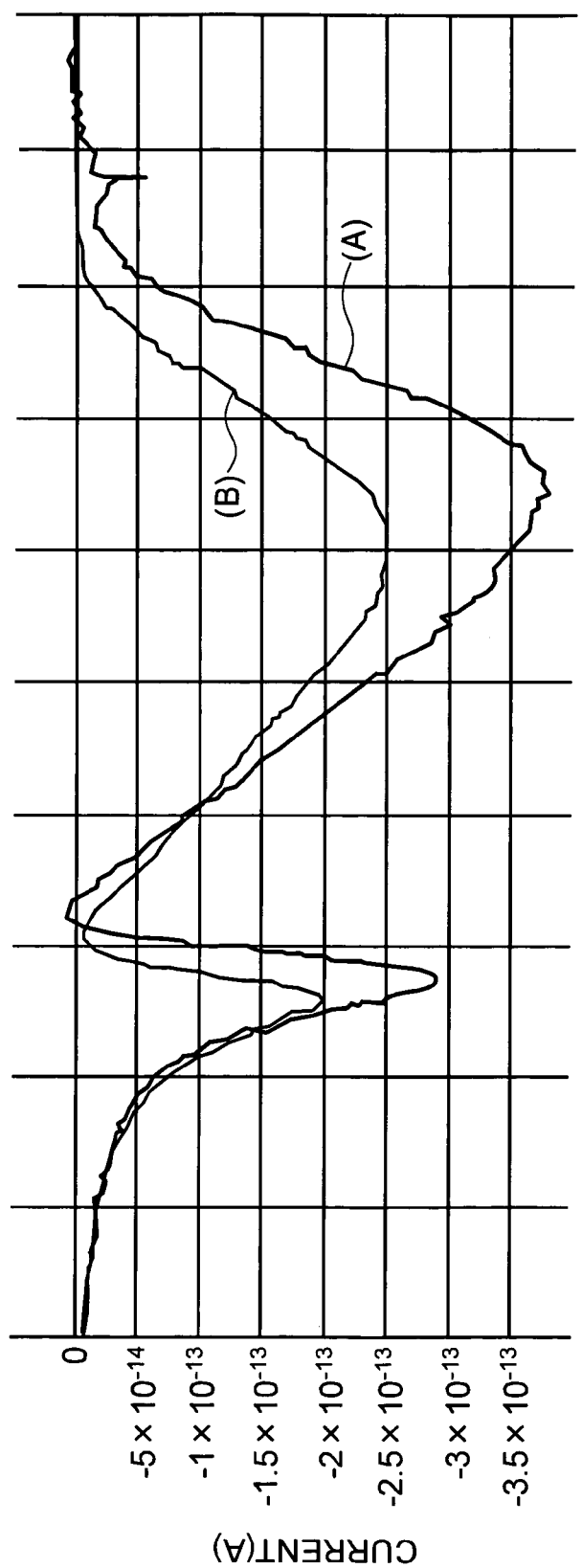

Also, FIG. 7 attached herewith shows an example of one of the result of the thermal stimulated current (TSC) being measured upon the sample (i.e., the toner for use of the electrophotography), in accordance with the measuring method, with using the measuring method mentioned above, in the form of a graph.

Namely, in this FIG. 7, a curve A of the thick line indicates the thermal stimulated current (TSC), which is actually obtained in the case of the (C) mentioned above; i.e., at temperature 30° C. and at humidity 90%; on the other hand, a curve B of the thin line the thermal stimulated current (TSC) in the case of a dry condition (i.e., no adjustment on humidity). However, the peaks on those curves at the left-hand side indicate those due to the fact that the electric charges being discharged accompanying with approaches to the vicinity of the glass transition point of resin portion of the toner (i.e., the transition from the condition of being glass-like into that of rubber-like), on the other hand the peaks at the right-hand side indicate those due to the fact that the electric charges being discharged accompanying with the crystal melting of resin portion of the toner. Also, herein, the reason of current flowing in a negative direction is due to the negative electrification of the toner, on the contrary to this, when the toner is charged or electrified in positive, it is apparent for the person skilled in the art that the current flows in a positive direction.

And, as apparent from comparison between those two (2) characteristic curves, which are obtained actually, for the toner for use of the electrophotography, it is clear that the thermal stimulated current (TSC) indicated therein differs from, also depending upon the change of the humidity when measuring. Namely, it can be seen that an amount of electrification, i.e., the performance of the toner, is influenced, largely, depending upon the humidity, as well as, the temperature. And, with the measuring method and also the measuring apparatus for the same, being proposed according to the present invention mentioned above, in particular, for measuring the physical characteristics or properties, such as, the thermoelectricity of the powder, since the humidity environment can be set, appropriately, when measuring the physical characteristics or property, in particular, of such the toner for use of the electrophotography, therefore, it is possible to make the measurement thereof under the condition near to the actual using situation thereof.

However, in the embodiments mentioned above, although there was described in details only about the measuring apparatus and the measuring method thereof, in particular, through the thermal stimulated current (TSC), as one of the measuring method of the thermoelectricity, for analyzing the physical characteristics or properties of the samples, including the powder therein, but the present invention should not be restricted only thereto. Thus, other than that, also the following measuring methods can be adopted to be the measuring method for the thermoelectricity, into which the present invention can be applied; such as, DEA (Dielectric Analysis), DTLS (Deep Level Transit Spectroscopy), ICTS (Isothermal Capacitance Transient Spectroscopy), TSIC (Thermally Stimulated Ionic Current), IV (Current-voltage characteristic), CV (Capacitance-Voltage characteristic), etc., for example.

Further, the measurement is conducted under the condition where the electrodes are in contact with the sample or not (i.e., either one of them is applied into, between the structures of the electrodes which are shown in FIGS. 3(a)–(c) or in FIG. 4 mentioned above), depending on the measuring methods thereof, in particular, when applying various measuring methods mentioned above therein; therefore, the difference between "contact" and "non-contact" is shown in the table below:

TABLE 1

| Measuring Method | Non-Contact | Contact |
|---|---|---|
| TSC | ○ | |
| TSIC/Ionic Current | | ○ |
| TSSP/Surface Potential | ○ | |
| IV/Current-Voltage | | ○ |
| CV/Capacitance-Voltage | ○ | ○ |
| DEA/Dielectric Relaxation | | ○ |

Also, with the example of application of the various kinds of measuring methods mentioned above (i.e., the sample to be measured), it should not be limited only to the toner, but the measuring method can be also applied onto the following; such as, a film, an organic thin film (such as, a photosensitive, an organic EL, anorganic FET, a sensor, a low-k material, etc.), an inorganic thin film (such as, a photo-catalyst, a low-k or high-k material, a ferroelectric, a fluorescent substance, etc.), a high polymer powder (such as, a mold material to be a sealing member for a semiconductor, etc.), an inorganic powder (such as, a fluorescent material, catalyst, etc.), and further medicines (including a powder, a tablet, and estimation of air-tightness of a package, etc.), for example, thereby enabling measurement on change of quality or deterioration due to moisture, so as to make an observation on an effect due to moisture. In addition thereto, also applying the present invention onto a living materials (such as, a protean film, a plant seed, etc., and further a gel-like tissue, a liquid-like tissue, etc.), and foods (such as, a flour, a grain of rice, a fish-paste product), enables the measurement of deterioration due to the moisture, so as to make an observation on an effect due to the moisture, while maintaining the sample as it is in the condition thereof, the character, the property thereof.

As was mentioned above, according to the present invention, it is possible to provide a measuring method for enabling the measurement on the thermoelectricity even under the atmosphere at a desired humidity (water-vapor), for analyzing the thermoelectric characteristics of the sample, and further a measuring method for measuring the thermoelectricity and also an apparatus for measuring the thermoelectricity with using thereof, thereby enabling the measurement on the thermoelectricity even under the atmosphere at the desired humidity (water-vapor), in particular, for analyzing the electrification characteristics of the powder sample, and enabling to obtain quantitative data being useful for studying upon the composition and the physical properties of a resin for use with the toner, and an adjusting method for the toner and also the condition thereof, as well as, the electrification characteristics of the toner, for example, with good reproducibility, while keeping it under the condition near to the actual using situation thereof, much more.

However, the present invention may be embodied in other specific forms, but without departing from the spirit or essential feature or characteristics thereof. The present embodiment(s) described herein is/are, therefore, to be considered in all respects as illustrative and not restrictive, but the scope of the invention being indicated by the appended claims rather than by the forgoing description and range of equivalency of the claims are therefore to be embraces therein.

What is claimed is:

1. A method of measuring thermoelectricity for analyzing physical characteristics of a sample through measuring thermoelectricity thereof, comprising the following steps of:
    a step for mounting the sample within an inside of a sample measuring apparatus, so as to measure the thermoelectricity thereof, wherein said measurement of the thermoelectricity is conducted upon said sample within an inside of said measuring apparatus, while keeping a measuring chamber thereof to be in an atmosphere of a desired water vapor within said measuring apparatus, in said measuring step of said thermoelectricity.

2. The method of measuring thermoelectricity, as defined in the claim 1, wherein a gas containing therein the water vapor at said desired value thereof is supplied into said measuring chamber within the inside of said measuring apparatus from an outside thereof, while setting a wall temperature of said measuring chamber to be a little bit higher than temperature of said gas, for keeping the atmosphere of water vapor within the measuring chamber of said measuring apparatus to be within a desired value thereof.

3. A method of measuring thermoelectricity for analyzing physical characteristics of a powder through measuring thermoelectricity thereof, with using the thermoelectricity measuring method as is described in the claim 1, comprising the following steps:
   a step for forming said power into a predetermined shape;
   a step for charging said powder formed into the predetermined shape with electricity; and
   a step for loading said shaped powder, being charged with electricity, into the inside of said measuring apparatus and for measuring thermal stimulated current thereof, wherein:
   the thermal stimulated current is measured upon the shaped powder, being charged with electricity, while keeping the inside of the measuring chamber of said measuring apparatus to be the desired atmosphere of water vapor, in said measuring step of said thermal stimulated current.

4. A method of measuring thermoelectricity for analyzing physical characteristics of a powder through measuring thermoelectricity thereof, with using the thermoelectricity measuring method as is described in the claim 2, comprising the following steps:
   a step for forming said power into a predetermined shape;
   a step for charging said powder formed into the predetermined shape with electricity; and
   a step for loading said shaped powder, being charged with electricity, into the inside of said measuring apparatus and for measuring thermal stimulated current thereof, wherein:
   the thermal stimulated current is measured upon the shaped powder, being charged with electricity, while keeping the inside of the measuring chamber of said measuring apparatus to be the desired atmosphere of water vapor, in said measuring step of said thermal stimulated current.

5. An apparatus of measuring thermoelectricity, for the method of measuring thermoelectricity as described in the claim 1, comprises:
   a constant-temperature chamber portion, within which said measuring chamber is formed;
   a heating-up portion, being received within said constant-temperature chamber portion;
   an electrode portion, being received within an inside of said constant-temperature chamber portion, and having a support electrode for mounting a material to be measured thereon and an opposing electrode, being provided separating from said supporting electrode through said material to be measured;
   a current detection portion for detecting thermal stimulated current from said material to be measured; and
   a means for guiding an atmosphere containing water vapor at a desired value thereof into said measuring chamber provided within said constant-temperature chamber portion.

6. The apparatus of measuring thermoelectricity, as described in the claim 5, wherein said water vapor atmosphere guiding means is controllable upon humidity of the water vapor guided into said measuring chamber, and also temperature thereof.

7. The apparatus of measuring thermoelectricity, as described in the claim 6, wherein a constant-temperature water supply apparatus, for supply a constant-temperature water to said constant-temperature chamber portion, controls temperature of the constant-temperature water to be supplied, to be little bit higher than the temperature of the water vapor atmosphere to be guided into said measuring chamber.

8. An apparatus of measuring thermoelectricity, for the method of measuring thermoelectricity as described in the claim 2, comprises:
   a constant-temperature chamber portion, within which said measuring chamber is formed;
   a heating-up portion, being received within said constant-temperature chamber portion;
   an electrode portion, being received within an inside of said constant-temperature chamber portion, and having a support electrode for mounting a material to be measured thereon and an opposing electrode, being provided separating from said supporting electrode through said material to be measured;
   a current detection portion for detecting thermal stimulated current from said material to be measured; and
   a means for guiding an atmosphere containing water vapor at a desired value thereof into said measuring chamber provided within said constant-temperature chamber portion.

9. The apparatus of measuring thermoelectricity, as described in the claim 8, wherein said water vapor atmosphere guiding means is controllable upon humidity of the water vapor guided into said measuring chamber, and also temperature thereof.

10. The apparatus of measuring thermoelectricity, as described in the claim 9, wherein a constant-temperature water supply apparatus, for supply a constant-temperature water to said constant-temperature chamber portion, controls temperature of the constant-temperature water to be supplied, to be little bit higher than the temperature of the water vapor atmosphere to be guided into said measuring chamber.

11. An apparatus of measuring thermoelectricity, for the method of measuring thermoelectricity as described in the claim 3, comprises:
   a constant-temperature chamber portion, within which said measuring chamber is formed;
   a heating-up portion, being received within said constant-temperature chamber portion;
   an electrode portion, being received within an inside of said constant-temperature chamber portion, and having a support electrode for mounting a material to be measured thereon and an opposing electrode, being provided separating from said supporting electrode through said material to be measured;
   a current detection portion for detecting thermal stimulated current from said material to be measured; and
   a means for guiding an atmosphere containing water vapor at a desired value thereof into said measuring chamber provided within said constant-temperature chamber portion.

12. The apparatus of measuring thermoelectricity, as described in the claim 11, wherein said water vapor atmosphere guiding means is controllable upon humidity of the water vapor guided into said measuring chamber, and also temperature thereof.

13. The apparatus of measuring thermoelectricity, as described in the claim 12, wherein a constant-temperature water supply apparatus, for supply a constant-temperature water to said constant-temperature chamber portion, controls temperature of the constant-temperature water to be supplied, to be little bit higher than the temperature of the water vapor atmosphere to be guided into said measuring chamber.

14. An apparatus of measuring thermoelectricity, for the method of measuring thermoelectricity as described in the claim 4, comprises:

a constant-temperature chamber portion, within which said measuring chamber is formed;

a heating-up portion, being received within said constant-temperature chamber portion;

an electrode portion, being received within an inside of said constant-temperature chamber portion, and having a support electrode for mounting a material to be measured thereon and an opposing electrode, being provided separating from said supporting electrode through said material to be measured;

a current detection portion for detecting thermal stimulated current from said material to be measured; and a means for guiding an atmosphere containing water vapor at a desired value thereof into said measuring chamber provided within said constant-temperature chamber portion.

15. The apparatus of measuring thermoelectricity, as described in the claim 14, wherein said water vapor atmosphere guiding means is controllable upon humidity of the water vapor guided into said measuring chamber, and also temperature thereof.

16. The apparatus of measuring thermoelectricity, as described in the claim 15, wherein a constant-temperature water supply apparatus, for supply a constant-temperature water to said constant-temperature chamber portion, controls temperature of the constant-temperature water to be supplied, to be little bit higher than the temperature of the water vapor atmosphere to be guided into said measuring chamber.

* * * * *